Oct. 3, 1939.       E. A. BENDER       2,174,771
FLUID SEALING CLOSURE BASE FOR FLORAL DISPLAY GLOBES
Filed Nov. 26, 1938
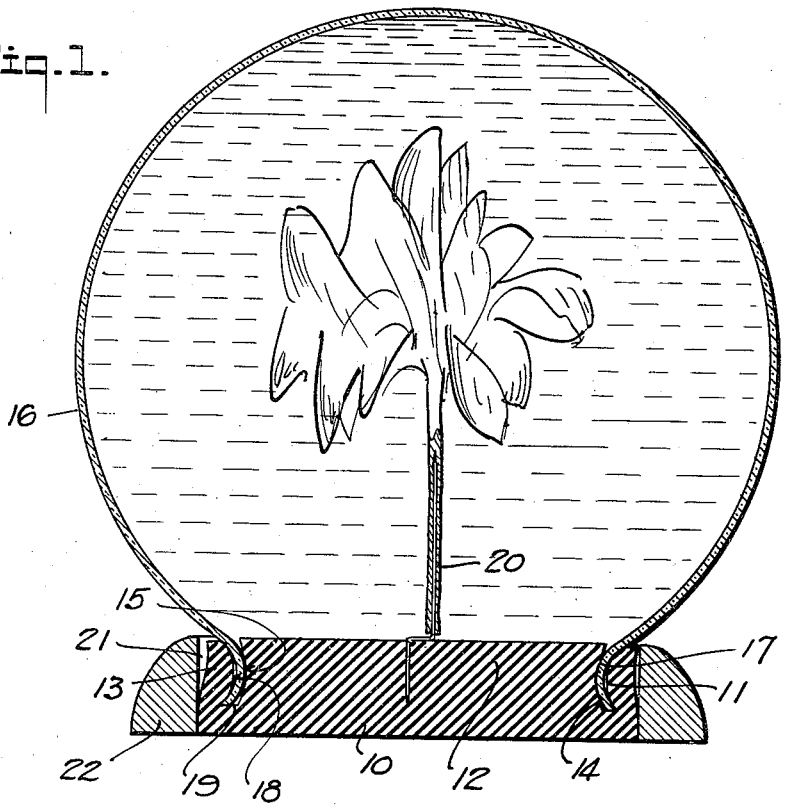
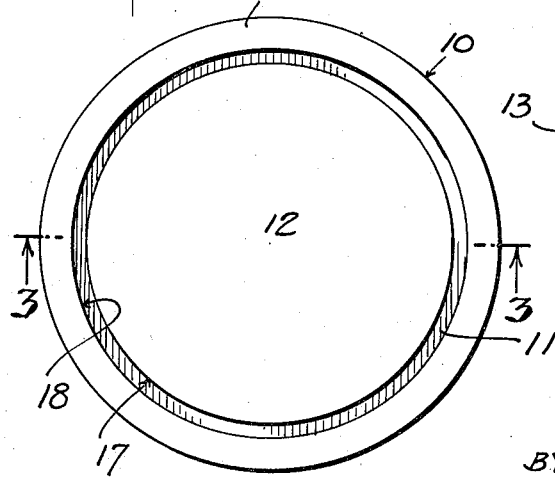
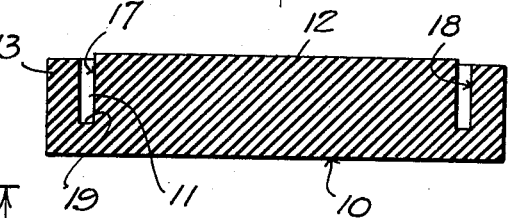
INVENTOR
EDWARD A. BENDER
BY Meren, Anderson & Liddy
ATTORNEYS Patented Oct. 3, 1939

2,174,771

UNITED STATES PATENT OFFICE 2,174,771

FLUID-SEALING CLOSURE BASE FOR FLORAL DISPLAY GLOBES

Edward A. Bender, Pasadena, Calif.

Application November 26, 1938, Serial No. 242,489

1 Claim. (Cl. 47—41)

This invention relates generally to flower and plant display devices and more particularly to transparent globular containers in which cut flowers are sealed and displayed in a body of liquid such as water, in order to obtain the magnifying, beautifying and preserving effects of the water upon the flowers for ornamental purposes.

An object of this invention is to provide a floral display globe embodying a closure forming base which is structurally characterized in a novel manner to coact with the globe in mechanically sealing a base opening thereof fluid tight with absolute security against leakage, so that maximum preservation of the contents will be had, and the possibility of water damage to the surroundings of the globe obviated.

Another object of the invention is to provide a fluid sealing closure base, for floral globes which is in the form of an integral elastic body coacting with the wall of the globe to form a triple seal, by exerting an internal expanding force upon an annular surface of the globe, an external constricting force upon a peripheral surface of the globe, and sealing pressure against the edge of an annular flaring flange or lip bounding the base opening of the globe, all while permitting the base to be easily applied to the globe and as readily removed therefrom.

With these and other objects in view, the invention consists in the combinations and arrangements of elements as set forth in the following specification, and particularly pointed out in the appended claim.

In the accompanying drawing,

Figure 1 is a view showing in vertical section a floral display globe, with one form of the invention applied thereto;

Figure 2 is a plan view of the invention, and

Figure 3 is a diametric sectional view taken on the line 3—3 of Figure 2.

Referring specifically to the drawing, the invention in its present embodiment comprises an integral body 10 of yieldable or resilient material such as elastic rubber, for example, which body is a disk having an annular groove 11 therein adjacent its periphery, and extending through the major thickness of the disk from one face thereof.

The groove 11 provides a closure plug portion 12 surrounded by an annular sealing flange portion 13, and is adapted to receive the flaring collar 14 bounding the filling opening 15 of a globular receptacle 16 of transparent material, such as glass.

The diameter of the plug portion 12 is such as to require that it be forced into the opening 15 so that the peripheral surface 17 of the portion 12 will tend to expand against the inner surface of the collar and thus provide an internal radially expanding fliud tight seal.

The internal diameter of the annular sealing portion 13 is such that the portion 13 will be expanded as the collar 14 enters the groove 11, and will be deformed by the flare of the collar, as shown in Figure 1, so as to exert a constricting force upon the collar in order that the internal annular surface 18 of the portion 13 will have contact with the outer surface of the collar, thus providing an external radially constricting fluid-tight seal.

Due to the flare of the collar 14, and the attending deformation of the annular sealing portion 13, the tendency of the latter in exerting its constricting force upon the collar is to be cammed by the collar in an axial direction, so as to urge the bottom wall 19 of the groove 11 into engagement with the edge or end face of the collar and thus exert sufficient pressure thereagainst to create a fluid-tight seal. Thus, the filling opening 15 will be triple sealed fluid-tight by the coaction of the body with the collar 14.

In the use of the floral display device, one or more stakes in the form of pins 20 are pushed into the plug portion 12 at the grooved side of the body 10, and the cut stems of suitable flowers applied to the stakes so as to be supported thereby. With the receptacle 16 inverted, water is supplied thereto through the filling opening 15, in sufficient quantity to approximately fill the receptacle, following which the body 10 is applied to the collar 14 of the receptacle to seal the contents thereof fluid-tight.

The receptacle can now be restored to upright position and the base forming body 10 then placed in the opening 21 of a holder 22 which forms an ornamental support for the receptacle. It will be appreciated that in addition to the camming action of the flared collar 14 upon the annular sealing portion 13, the weight of the receptacle and its contents serve to increase the tightness of the seal at the bottom wall 19 of the groove 11 to further insure the fluid-tightness of the triple seal provided by the body 10, whereby to positively prevent leakage of water from the receptacle.

What is claimed is:

In a floral display device of the type including a globular transparent receptacle having a filling opening bounded by a flaring collar, a fluid sealing closure base comprising an integral disk body of resilient material having a narrow straight-walled annular groove in one face thereof defining a closure plug portion and a surrounding annular sealing portion; the external diameter of said plug portion being such as to require it to be forced into the filling opening and deformed from its straight-walled condition to conform to the internal flared surface of said collar, whereby to provide an expanding fluid-tight seal in the collar, and the internal diameter of said annular sealing portion being such as to be deformed from its straight-walled condition to conform to the external flared surface of said collar, whereby to provide a constricting fluid-tight seal on the collar; the inner surface of said annular sealing portion having a camming action upon the flare of the collar to draw the body axially into fluid-tight sealing engagement of the bottom wall of said groove with the outer edge of the collar, whereby to provide a triple fluid-tight seal between the body and the receptacle.

EDWARD A. BENDER.